Oct. 6, 1959 R. H. WISE 2,907,564
ACTUATOR FOR COMPOUND MOTION VEHICULAR WINDOWS
Filed Aug. 17, 1955 4 Sheets-Sheet 1
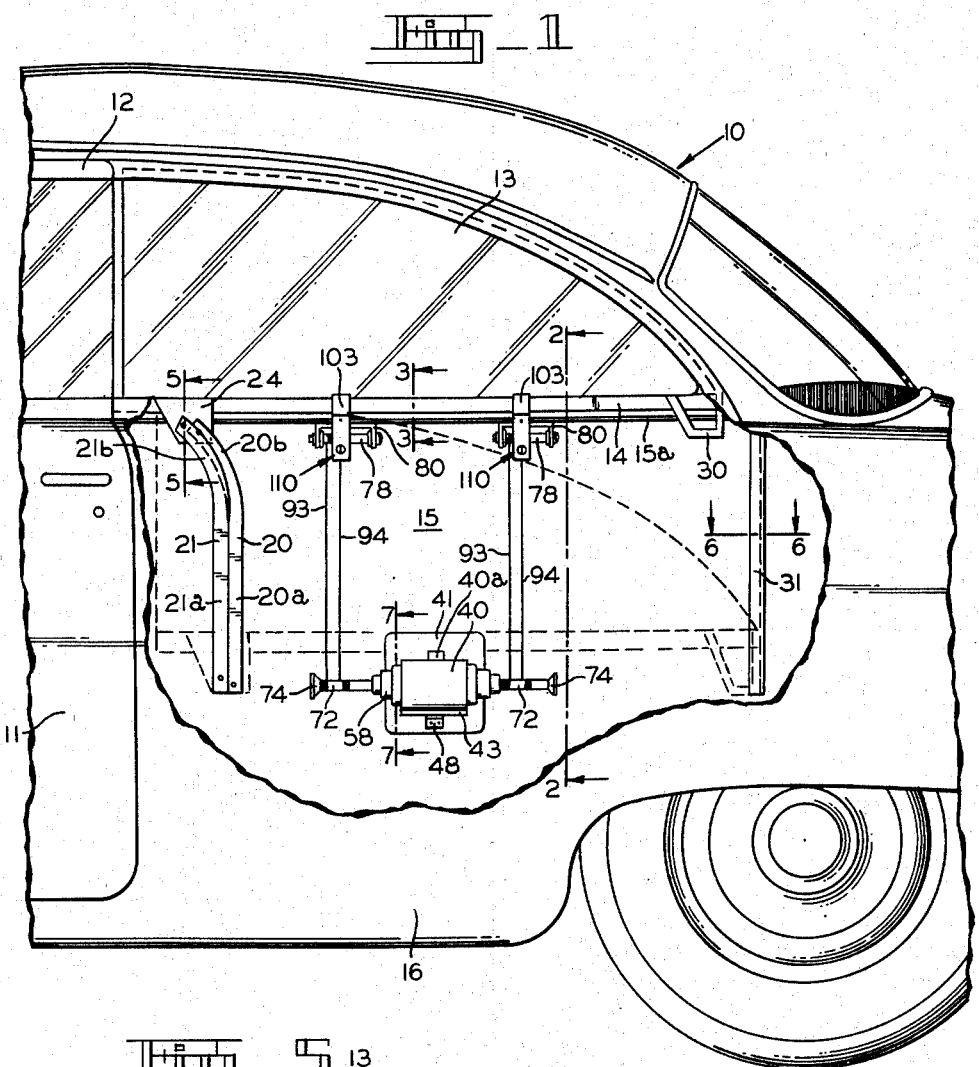
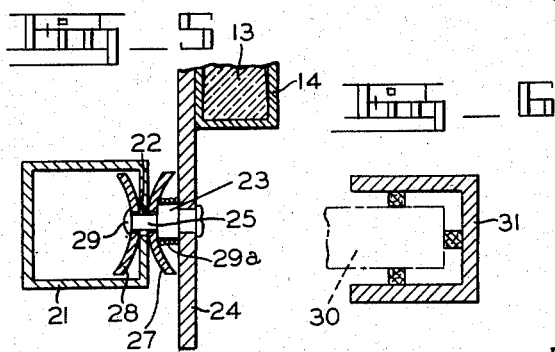
INVENTOR.
RALPH H. WISE
BY H P Settle, Jr
ATTORNEY

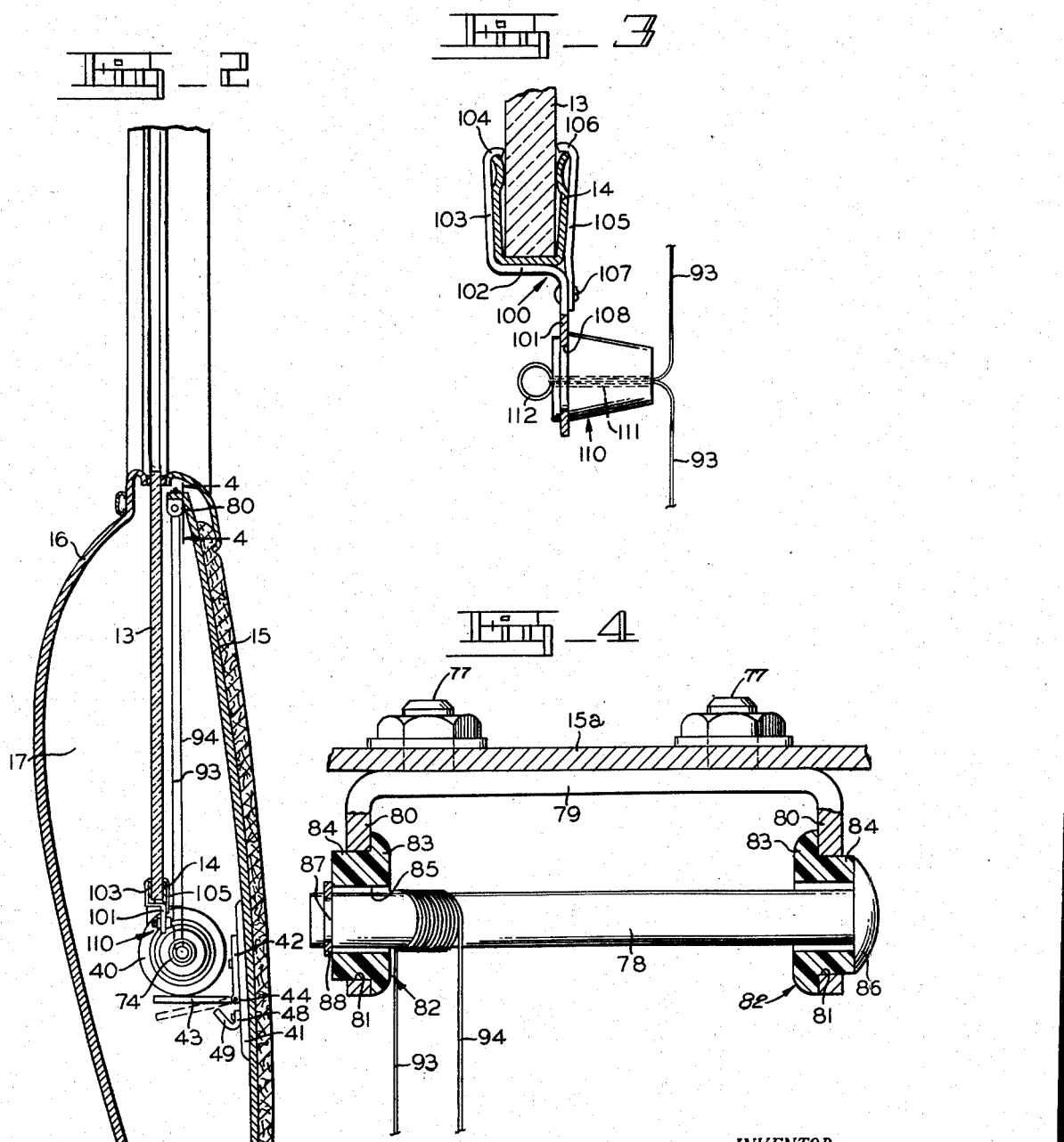

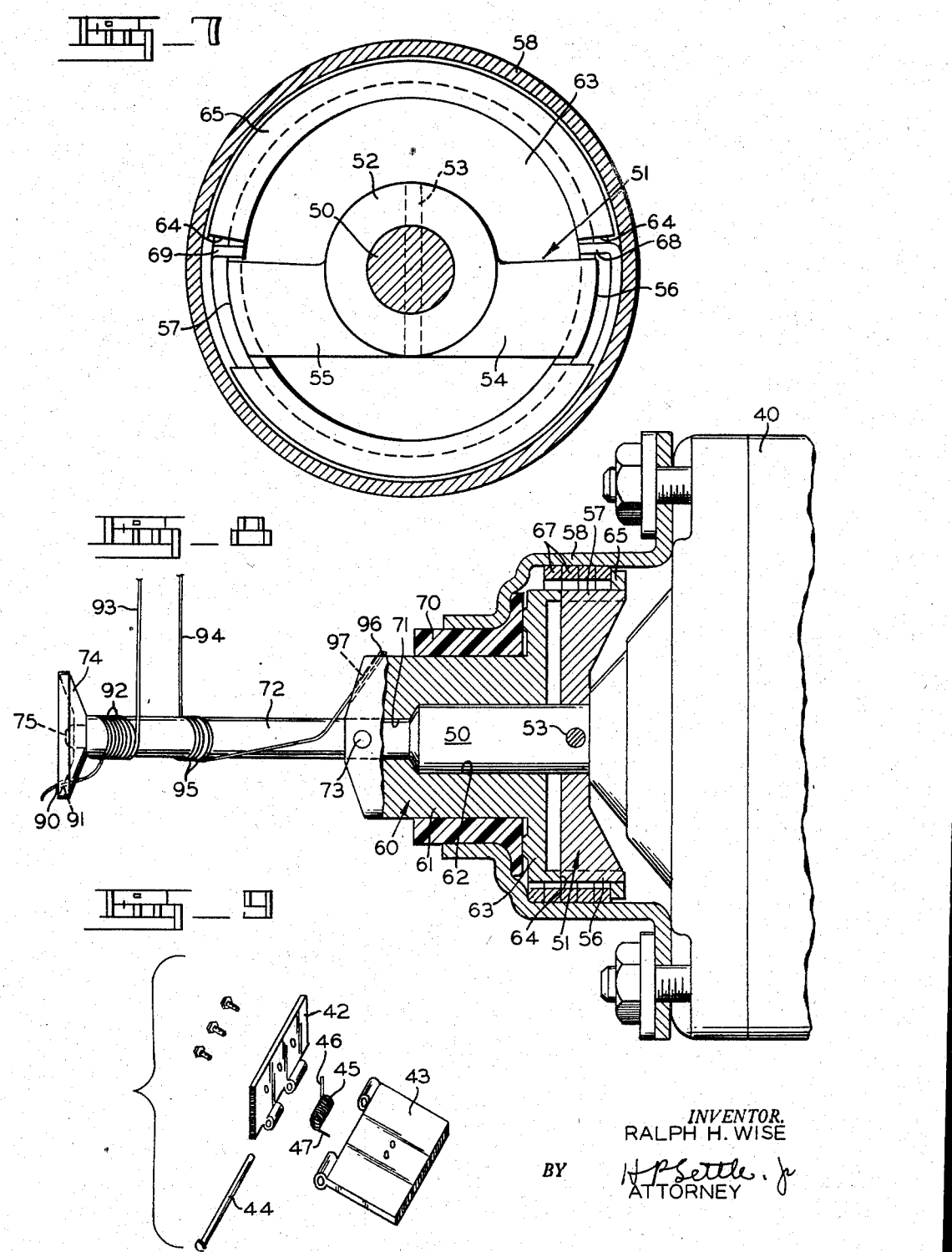

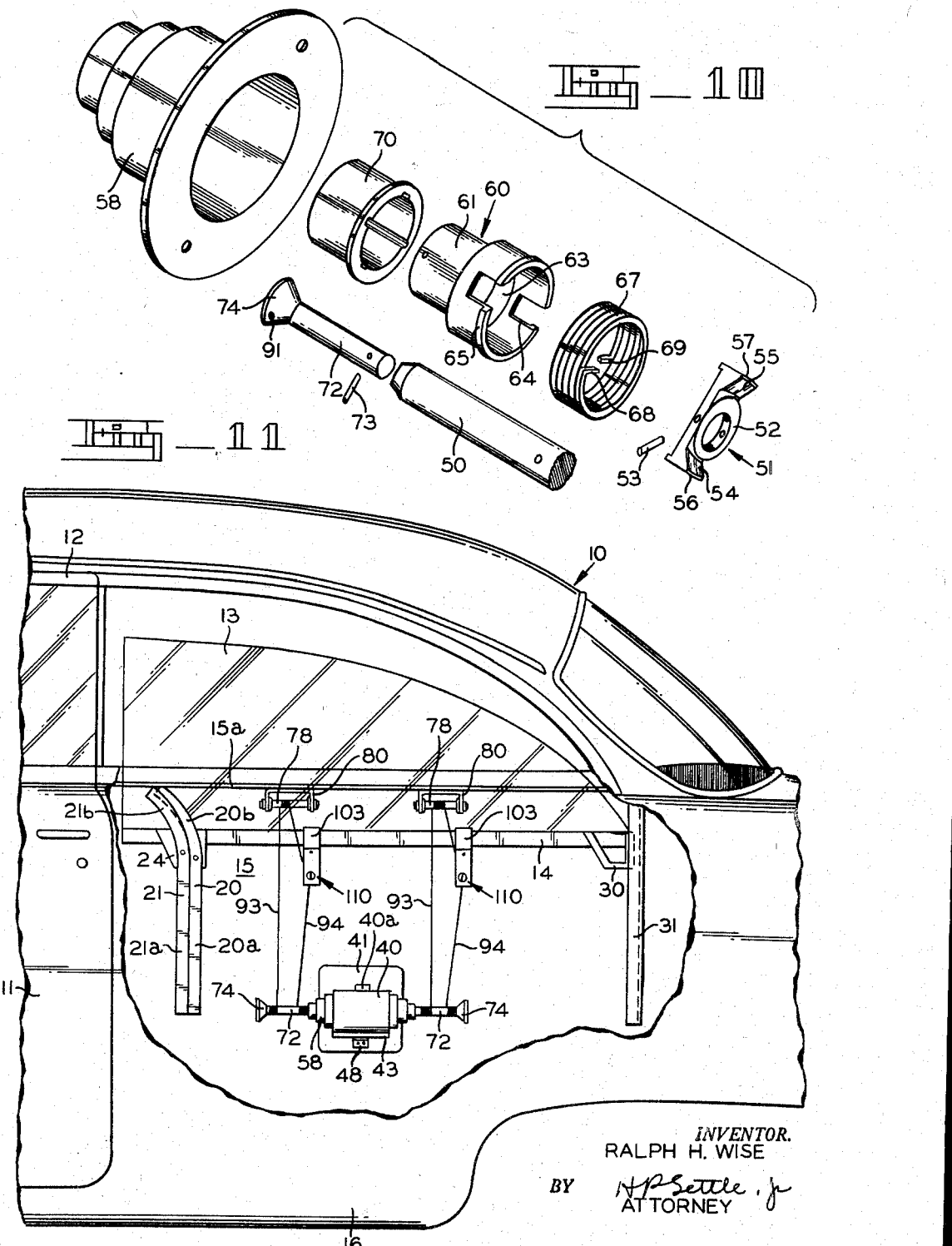

United States Patent Office 2,907,564
Patented Oct. 6, 1959

2,907,564

ACTUATOR FOR COMPOUND MOTION VEHICULAR WINDOWS

Ralph H. Wise, Gary, Ind., assignor, by mesne assignments, to The Anderson Company, a corporation of Indiana Application August 17, 1955, Serial No. 528,890

7 Claims. (Cl. 268—124)

The present invention relates to an actuator for a window, and more particularly to an actuator for a vehicular window or the like which moves with a compound motion, i.e., both vertically and laterally, during actuation of the window to and from its closed position.

In recent years, the "hardtop" type of automotive body has become increasingly popular, in both two-door and four-door body styles. In this type of automotive body, there is no "center post" or other fixed window guiding structure interposed between the front and rear windows of the automobile. The rear window must move both vertically and laterally in order to bring it into snug engagement with the molding or frame of the front window. This type of movement has greatly complicated the window actuating structure, particularly when the actuation is by power means.

The present invention now provides an improved actuating mechanism, specifically adapted in its illustrated embodiment to the power actuation of this type of rear window which moves both vertically and laterally to and from its closed position.

Generally, the device of the present invention proposes the utilization of a cable drive for the window, the cable being looped about and joining a pair of vertically spaced shafts, one of the shafts being driven by suitable means, such as an electric motor. The use of the flexible cable drive of course necessitates continuous tensile operation of the driving cable and a novel cable drive mechanism is hereby provided for this purpose. Further, the flexible cable drive accommodates the lateral shifting of the window without disturbing the positive, two-way tension drive between the two shafts.

The actual path of movement of the window is governed by the cooperating channel and guide means interconnecting the window and the vehicular body to accommodate lateral shifting, as well as vertical movement. To prevent the lowering of the window without actuation of the power means, as upon operation of the automobile over a rough road or upon placing the hands on the window and shoving downwardly thereon, a novel type of one-way clutch is provided which operates to drive the shaft in either direction from the actuating means such as an electric motor, but which prevents the reverse movement of the shaft upon the imposition of a reversely operating force from the window to the motor.

It is, therefore, an important object of the present invention to provide an improved actuator for a compound motion vehicular window.

It is another important object of the present invention to provide an actuating mechanism for the type of both vertically and laterally movable window, commonly utilized in "hardtop" body styles, and which is actuated by a power means to positively raise and lower the window while accommodating lateral shifting movement of the window, as necessitated by the window guide and channel structure.

Another important object of the present invention is the provision of an improved actuating mechanism for utilization with a movable window, the actuating mechanism including a cable drive for connecting a source of power to the window together with mechanism for operating the cable drive in tension during both lowering and raising movement of the window.

Yet a further object of this invention is the provision of an improved power-actuating mechanism for a substantially vertically movable window utilizing a pair of rotatable shafts, flexible means joining the shafts, and a fixed connection between the cable system and the window whereby power operation of one of the shafts will elevate and lower the window.

It still another object of the present invention to provide a window-actuating mechanism having an actuating cable joining a pair of shafts, means for driving the shafts to raise and lower the window, and an overrunning clutch mechanism joining one of the shafts to the power mechanism to prevent movement of the window upon the subjection of the same to a force attempting to displace the window.

Other and further important objects of the present invention will become apparent from a study of the detailed description of the invention as hereinafter set forth and an inspection of the appended drawings.

On the drawings:

Figure 1 is a side elevational view, with parts broken away, of an automotive vehicle incorporating a window actuator of the present invention;

Figure 2 is a sectional view taken along the plane 2—2 of Figure 1;

Figure 3 is an enlarged sectional view taken along the plane 3—3 of Figure 1;

Figure 4 is an enlarged sectional view, with parts broken away and in section, taken along the plane 4—4 of Figure 2;

Figure 5 is an enlarged sectional view taken along the plane 5—5 of Figure 1;

Figure 6 is an enlarged sectional view taken along the plane 6—6 of Figure 1;

Figure 7 is an enlarged sectional view taken along the plane 7—7 of Figure 1;

Figure 8 is an enlarged fragmentary view of the motor clutch illustrated in Figures 1 and 7, with portions broken away and in section;

Figure 9 is an enlarged, exploded perspective view of the motor hinge construction of Figure 1;

Figure 10 is an enlarged, exploded perspective view of the motor clutch mechanism illustrated in Figures 7 and 8; and Figure 11 is a view similar to Figure 1, but illustrating the window in an operated, i.e., lowered, position.

As shown on the drawings:

Figure 1, reference numeral 10 refers generally to an automotive vehicle of the "hardtop" type having a front door 11 provided with a vertically movable window 12. The car 10 is also provided with a rear window 13 which is bound on its lower edge by a supporting metal channel 14. The front window is provided at its rear edge with the necessary weather stripping (not shown), and the movement of the rear window 13 into weather-tight contact with the front window 12 requires both vertical and lateral movement of the window, as will be hereinafter explained.

As shown in Figure 1, the window 13 is supported for vertical movement by cooperating guiding and channel members. The channel members are carried by a body component, such as a body panel 15 (Figure 2) which cooperates with an outer body panel 16 to define an interior body space 17 into which the window is retractable to open the window area. The inner body panel 15 carries a pair of guide channels 20 and 21, one of which is best illustrated in Figure 5. It will be seen that the channel member 21 is substantially a closed box section having a longitudinal slot 22 formed therein to receive a pintle 23 fixedly secured to a bracket 24 which is fixed to the window molding 14. The pintle 23 secured to the bracket 24 has a reduced portion 25 adjacent its outer end and projecting through the central apertures of a pair of convex slide washers 27 and 28. The slide washers 27 and 28 contact the opposite sides of the leg of the box channel 21 which is provided with the slot 22, the slide washer 28 being positioned on the inside of the channel. The pintle 23 terminates in an enlarged head 29 which is preferably upset after the washers 27 and 28 have been disposed upon the reduced portion 25 of the pintle to secure the washers thereto. A coiled compression spring 29a is interposed between the bracket 24 and the outer washer 27 to urge the washers 27, 28 into snug engagement with the channel.

It will be noted that the lower portions 20a and 21a of the guiding channels 20 and 21 extend substantially vertically within the body space 17, while the upper ends of the channels are deflected laterally toward the door 11. The forward deflection of the portions 20b and 21b of the channels 20 and 21 will effect lateral movement of the window when the ends of the pintles 23 enter these portions of the channels. Further, it will be appreciated that through the use of a pair of pintles operating in the pair of channels 20 and 21, lateral stability is imparted to the window.

The window is also provided at its rearmost portion with a second depending bracket 30 functioning as a guide means cooperating with a vertical channel 31 which is disposed rearwardly of the window when the window is in its closed position as illustrated in solid outline in Figure 1. Upon lowering movement of the window 13, the window 13 is moved rearwardly by virtue of the curved upper ends 20b and 21b of the channels 20 and 21 and this rear movement causes the bracket 30 to enter in the U-shaped channel 31, as illustrated in dotted outline in Figure 6. Thus, after lateral movement of the window has been completed, the window is stabilized adjacent both its forward and its rear end by the cooperating channels 20, 21, and 31.

The actuating mechanism of the present invention preferably comprises an electric motor indicated generally at 40 (Figures 1 and 2), this motor being carried by the inner body panel 15. The motor is mounted fixedly upon a supporting plate 41 which is secured to the inner door panel and which carries one leaf 42 of a hinged motor mount, the other leaf 43 of the hinged motor mount being secured to the first leaf 42 by means of a longitudinally extending pintle 44. A coiled spring 45 of the mousetrap type is provided with a first end 46 engaging hinge leaf 42 and a opposite lower end 47 which engages the upper surface of the lower leaf 43 of the hinged mount. The spring 45 is effective to urge the lower leaf 43 downwardly for a purpose to be hereinafter more fully described. It will be noted that the motor mounting plate 41 also carries a stop 48 having an upwardly extending leg 49 for limiting the degree of downward movement of the lower hinge plate 43.

As illustrated in detail in Figures 7, 8, and 10, the motor 40 is provided with a double-ended armature shaft 50 which projects beyond each lateral extremity of the motor armature. Figure 8 and Figure 10 illustrate only one end of the motor 40, it being appreciated that each end of the motor is provided with an identical structure. The shaft 50 has pinned thereto a clutch drive plate 51. This clutch drive plate is best illustrated in Figure 7 and comprises a central collar 52 telescoped over the armature shaft 50 and secured thereto for corotation, as by pin 53. The clutch drive plate 51 is provided with oppositely directed radially extending driving projections 54 and 55 which terminate in arcuate extremities 56 and 57, respectively, which are radially spaced from the motor end or cover plate 58 (Figure 8).

The clutch drive plate cooperates with a clutch driven plate 60 (Figures 8 and 10), the clutch driven plate 60 comprising an outer cylindrical portion 61 having an axial recess 62 therein which receives the outer end of the armature shaft 50 of the motor 40, and with a radially enlarged flange 63 provided with a transverse slot 64 which receives therein the outer arcuate extremities 56 and 57 of the driving clutch plate 51.

The driven clutch plate 60 terminates in a radially outwardly directed flange 65 which serves to confine axially a coiled spring 67. This spring 67 is of the radially expanding type and, when at rest, the spring 67 expands radially outwardly into contact with the inner surface of the motor cover cap 58. The spring 67 is provided with opposed ends 68 and 69 which are radially inturned to lie in the path of movement of the outwardly extending arms 54, 55, respectively, of the clutch drive plate. In addition, the ends 68 and 69 of the spring 67 are actually interposed between the clutch driving plate 51 and the clutch driven plate 60. In other words, the slot 64 in the driven plate 60 is of an arcuate extent sufficient to receive the driving clutch plate arms 54 and 55 and the spring ends 68 and 69, plus some slack room, all as illustrated in Figure 7.

The clutch driven plate is journaled in the end cap 58 of the motor 40 by means of a plain bearing 70, formed of a suitable bearing material, preferably nylon, the bearing being interposed directly between the end cap 58 and the driven clutch element 60.

The recess 62 of the clutch element 60 which receives the armature shaft 50 communicates with a smaller recess 71 within which is positioned an axle extension 72 which is axially aligned with the armature shaft 50 and which projects a substantial distance beyond the case of the motor 40. The axial extension 72 and the clutch element 60 are secured together for corotation by suitable means, as by pin 73. The outer end of the axial extension 72 carries a dished washer 74 which is secured thereto by suitable means as by screw 75 for a purpose to be hereinafter more fully described.

The operation of the clutch for the motor 40 will be readily understood, since it is obvious that rotation of the armature shaft 50 will cause corotation of the driving clutch plate 51. Rotation of the clutch plate in a counterclockwise direction, as viewed in Figures 1 and 7, will cause the clutch plate arm 54 to abut the spring end 68 and the spring end will be moved peripherally until it contacts the adjacent edge of the slot 64 in the other clutch element 60. This movement of the spring 68 will cause the spring radial diameter to decrease, pulling the spring from peripheral contact with the motor end housing 58, and effecting corotation of the two clutch elements 51 and 60. Thus, the axial extension 72 will be rotated with the armature shaft 50. Conversely, clockwise rotation of the armature shaft 50 will cause the other extension 55 of the clutch plate 51 to abut the other end 69 of the spring, moving the spring into contact with the edge of the slot 64, and thereafter causing corotation of the armature shaft and the axial extension 72.

However, upon an attempt to rotate the axial extension 72, attempted movement of the clutch will be prevented by the peripheral engagement of the spring 67 with the end cap 58 of the motor 40. This is caused by the fact that initial rotation of the clutch element 60 will not cause peripheral retraction of the spring, but rather will cause the spring to expand out into engagement with the end cap.

Thus, the heretofore-described clutch mechanism provides means for driving the axial extension 72 in either rotative direction upon energization of the motor 40, while at the same time preventing any movement of the axial extension 72 when the drive is in the reverse direction.

The motor 40 and the clutch comprising the two elements 51 and 60 are utilized to drive the axial extensions 72 for elevating and lowering the window 13 through a cable drive system. More particularly, the extensions 72 form the cable drive elements, but the drive cables must be looped over idler shafts 78 to provide for a tension cable system capable of driving the window in either direction.

Such idler shafts 78 are provided by the structure best shown in Figures 1 and 4 of the drawings,, wherein inverted U-shaped brackets are secured to the upper portions of the inner door panel 15 by stud bolts or the like 77 secured to an inturned flange 15a of the panel 15 to retain the bight portion 79 of the bracket in flush relation to the flange 15a. The leg portions 80 of the bracket depend into the interior of the body section and are apertured, as at 81.

Seated in the apertures 81 are plain bearings 82 having enlarged heads 83 seated against the inner surfaces of the legs 80 and reduced diameter pintle portions 84 projecting through the apertures 81.

The bearings 82 are centrally apertured, as at 85, to receive therethrough the idler shaft 78. The idler shaft 78 is provided at one end with an enlarged head 86 abutting one of the bearings 82, while the other end of the idler shaft 78 is provided with a peripheral groove 87 receiving therein a snap-ring or other fastening device 88 which snugly abuts the opposite bearing 82. It will be appreciated that the idler shaft 78 is freely rotatable within its bearings 82 about an axis which is parallel to the axis of rotation of the associated axial extension or driving shaft 72.

Joining the shafts 72 and 78 is a cable connection. A single length of cable interconnects each pair of associated shafts 72 and 78, the cable having one end 90 passed through an opening 91 in the dished washer 74 at the outer end of the associated drive shaft 72, with adjacent portions of the cable being wrapped about the drive shaft, as at 92, with the cable then being led upwardly from the drive shaft, as at 93, to the idler shaft 78. The cable now is wrapped about the idler shaft, with the free end of the cable then being led downwardly, as at 94, to the drive shaft and being wrapped about the drive shaft, as at 95, until the free end of the cable is anchored to the driven clutch plate, as by a knot 96 made in the free end of the cable which has been led through a passage 97 formed in the driven clutch plate 60. The two substantially vertical reaches 93 and 94 of the cable drivingly interconnect the driving shaft 72 and the driven shaft 78, regardless of the direction of rotation of the driven shaft 72.

As best illustrated in Figures 1, 2, and 3, the reach 93 of the cable is operatively fixedly connected to the window 13. This connection is accomplished by means of a clip 100 which comprises a first member 101 having a vertically extending lower portion, a laterally deflected intermediate portion 102 underlying the channel 14 of the window 13, and upwardly extending portion 103 extending alongside the channel 14, and a terminal inwardly directed hook 104 overlying the channel. Secured to the upstanding portion 101 of the first clip element 100 is a second clip element 105 which terminates in an inwardly directed hook 106. The hook elements 100 and 105 are interconnected by a suitable means, as by rivet 107. The attachment of the clip to the channel will be readily understood, inasmuch as it is only necessary to spread the legs 103, 105, position them on opposite sides of the channel and then push the clip upwardly until the hooks 104 and 106 are engaged over the upper end of the channel.

The upright portion 101 of the element 100 is apertured, as at 108, to receive therethrough a connecting element 110 which is of generally frusto-conical configuration and which is provided with an axial bore 111 which is of an axial extent sufficient to receive therethrough a portion of the reach 93 of the cable. The cable is merely deflected through the bore 111 and a ring 112 is positioned in the loop of cable thus formed, the ring being so large as not to be removable through the bore 111. The ring 112 is pulled tightly against the element 110 by tension of the cable reach 93 and so an adjustable fixed interconnection between the cable and the window 13 is provided.

The operation of the device of the present invention will be readily understood. To operate the window 13, it is only necessary to energize the motor 40 which, through the clutch elements 51, 60, will drive the axial extension 72 which forms the driven shaft of the actuating mechanism. Rotation of the shaft 72 in a counter-clockwise direction, as viewed in Figure 2, will tension the reach 93 of the cable so as to pull the window downwardly. Resistance to this movement of the window downwardly is provided by the reach 94 of the cable, since this cable must be unwound from the drive shaft 72 before sufficient cable is available to wrap around the drive shaft from the reach 93. Conversely, operation of the shaft 72 in a clockwise direction (Figure 2) will elevate the window by tensioning the reach 94 of the cable pulling the reach 94 upwardly as it unwinds from the drive shaft 72 to elevate the connecting means 110 and the window. During both of these operations, the drive will be from the armature shaft 50, through the clutch plate 51, the spring 67 and the driven clutch element 60 to the axial extension 72 which forms the actual driving shaft of the window-actuating mechanism. If, however, an attempt is made to depress the window manually, or if the car is driven over a rough road jolting the window, there will be no drive backward from the shaft 72 to the shaft 50, inasmuch as movement of the shaft 72 will move the clutch plate 60 so as to expand the spring 67 against the motor cap 58.

The adjustable connection provided by the ring 112, the loop in the cable reach 93 within which the ring is seated, and the connecting element 110 provides a readily adjustable connection by which the initial position of the window on the cable relative to the shafts 72 and 78 may be adjusted. By merely pulling the ring to the left, as illustrated in Figure 3, the cable may then be adjusted so that the loop is positioned as desired.

The manner in which the device functions to accommodate the lateral movement of the window 13, which lateral movement is coincident to the vertical movement because of the curved configuration of the guides 20 and 21, as heretofore explained, will be readily evident from an inspection of Figures 1 and 2 and a comparison of the positions of the cable reaches upon the drive shaft 72 and the idler shaft 78. When the window is in its elevated position, each of the cables is wrapped about each of the idler shafts 78 at the forward extremity thereof and about each of the driving shafts 72 at the forward extremity thereof. As the window moves rearwardly, the point of connection constituted by the member 110 and the ring 112 moves rearwardly with the window. This movement rearwardly will effect relative movement between the window attachment points and the two shafts 72 and 78. Inasmuch as the cable is merely looped about the two shafts 72 and 78, the loops of the cable will be moved axially along the length of these shafts, in much the same manner as a fishing line is moved axially of a fishing reel. Thus, the movement of the looped portions of the cable upon the two shafts will readily accommodate the misalignment which is inevitable as a result of lateral window movement.

The mousetrap spring 45 serves to maintain tension on the cable reaches 93, 94 during operation of the device, since the spring urges the motor 40 and the extensions 72 downwardly. The motor 40 is surmounted by a stop 40a which is abutted by the window when the window is fully lowered. The motor will be moved downwardly upon such abutment against the motor stop 49 to prevent further lowering of the window.

It will be understood that tension in the cables tends to hold the motor and bracket upwardly off the motor stop. However, the distance from the normal motor position to the motor position when in the stop is less than the depth of the window-to-body panel sealing strips, so that even when the motor is against its stop and the window is raised, the window is fully closed.

It will be readily appreciated by those skilled in the art that the present invention provides an extremely simple, and inexpensive, method of an apparatus for actuating a window to and from a closed position. The device of the present invention is particularly adapted for use with windows having a compound vertical and lateral movement although it is obvious that the mechanism of the present invention may be utilized in connection with a window which is movable in a vertical plane only.

It will, of course, be understood that various details of construction may be varied through a wide range without departing from the principles of this invention, and it is, therefore, not the purpose to limit the patent granted hereon otherwise than necessitated by the scope of the appended claims.

I claim:

1. A mechanism for opening and closing a window guided for compound movement in both a lateral and a vertical direction by cooperating channel and guide members, comprising a rotatable driving shaft, means for rotating said driving shaft in either direction, a driven shaft having its axis parallel to the axis of rotation of said driving shaft, a cable looped about and having two oppositely tensionable reaches drivingly connecting said shafts, and means on said window operatively interconnecting the window and said cable intermediate the shafts, rotation of said driving shaft in one direction tensioning one reach of the cable to operate the window vertically and laterally to close the same and rotation of said driving shaft in the opposite direction tensioning the other reach of the cable to open the window by moving it laterally and vertically.

2. In a mechanism for actuating a vehicular window movable in a compound path in two planes to open and close a vehicular body opening, the window being guided for movement by cooperating channel and guide members, the improvements of spaced axially parallel driving and idler shafts mounted on the vehicular body, a drive cable looped about and joining said shafts with two reaches of cable extending therebetween, means for driving said driving shaft in either direction to tension one or the other reaches of said cable, and means on said window movable therewith and fixed to said cable, said shafts being an axial length at least coextensive with the amount of movement of said window in one plane and being spaced from each other through a distance at least coextensive with the amount of window movement in the other of said planes.

3. In an automotive vehicle having a window disposed on cooperating channel and guide elements for both vertical and lateral movement in a vehicular body component, a power actuation mechanism for the window comprising a reversible motor disposed in said body component generally beneath the window and having a laterally extending double-ended armature shaft, elongated shaft extensions axially aligned with the respective ends of said armature shaft, a double-acting one-way clutch respectively joining one of said extensions to the adjacent end of said shaft, an elongated idler shaft located above and in vertical alignment with each of said shaft extensions, a cable anchored to each of said shaft extensions and looped about said shaft extensions and the associated idler shaft to provide a pair of cable strands joining each extension to the associated idler shaft, a pair of spaced brackets fixed to the window, and means adjustably securing each of said brackets to an adjacent one of the cable strands, so that one of each pair of cable strands is operatively connected to the window, operation of the motor tensioning one of each pair of cable strands to elevate or lower the window, the direction of movement of the window being determined by the direction of motor operation, the cable portions looped over the shaft extensions and idler shafts traveling axially therealong to accommodate lateral window movement.

4. A mechanism for elevating and lowering a vehicular window movable vertically and laterally to open and close a vehicular body opening, the window being guided for movement by cooperating channel and guide members, said mechanism comprising vertically spaced, laterally extending, axially parallel driving and driven shafts mounted on the vehicular body, a drive cable looped about and joining said shafts with two vertically extending taut strands of cable extending therebetween, means for driving said driving shaft in either direction to tension one or the other strands of said cable, means joining one of the strands of said cable to the strands of the window, and biasing means acting on one of said shafts to maintain tautness on said cable, said shafts being of a length at least coextensive with the amount of lateral movement of said window.

5. In an automotive vehicle having a window disposed on cooperating channel and guide elements for both vertical and lateral movement in a vehicular body component, an actuation mechanism for the window comprising elongated, axially spaced drive shafts, means for jointly driving said shafts, an elongated idler located generally above and in axial parallelism to each of said shafts, a cable anchored to each of said shafts and looped about said shafts and the associated idler to provide a pair of cable strands joining each shaft to the associated idler, and means adjustably securing laterally spaced portions of the window to an adjacent one of the cable strands, so that one of each pair of cable strands is operatively connected to the window, rotation of the shafts tensioning one of each pair of cable strands to elevate or lower the window, the direction of movement of the window being determined by the direction of shaft rotation, the cable portions looped over the shafts and idlers traveling axially therealong to accommodate lateral window movement.

6. In an automotive vehicle having a window disposed on cooperating channel and guide elements for both vertical and lateral movement in a vehicular body component, a power actuation mechanism for the window comprising a reversible motor disposed in said body component generally beneath the window and having a laterally extending double-ended armature shaft, elongated shaft extensions axially aligned with the respective ends of said armature shaft, a double-acting one-way clutch respectively joining one of said extensions to the adjacent end of said shaft, an elongated idler shaft located above and in vertical alignment with each of said shaft extensions, a cable anchored to each of said shaft extensions and looped about said shaft extensions and the associated idler shaft to provide a pair of cable strands joining each extension to the associated idler shaft, biasing means acting on the motor to insure tautness of the cable strands, a pair of spaced brackets fixed to the window, and means adjustably securing each of said brackets to an adjacent one of the cable strands, so that one of each pair of cable strands is operatively connected to the window, operation of the motor tensioning one of each pair of cable strands to elevate or lower the window, and said one-way clutches preventing driving of said armature shaft from said shaft extensions.

7. In a mechanism for elevating and lowering a vehicular window movable primarily vertically and also laterally to open and close a vehicular body opening, the window being guided for movement by cooperating channel and guide members, means for vertical power actuation of the window while accommodating lateral movement thereof, comprising vertically spaced laterally extending driving and driven shafts mounted on the vehicular body, a drive cable looped about and joining said shafts with two vertical reaches of cable extending therebetween, means for driving said driving shaft in either direction to tension one or the other reaches of said cable, and means fixed to said window for vertical and lateral movement therewith and fixed to one of the reaches of said cable intermediate said shafts, said shafts being of a length at least coextensive with the amount of lateral movement of said window, so that travel of the cable axially of the shafts is effected during lateral window movement.

References Cited in the file of this patent

UNITED STATES PATENTS

| | | |
|---|---|---|
| 1,486,963 | Heintz | Mar. 18, 1924 |
| 1,928,423 | Hansen | Sept. 26, 1933 |
| 2,615,711 | Niquette | Oct. 28, 1952 |
| 2,621,542 | Rath | Dec. 16, 1952 |
| 2,798,761 | Himka | July 9, 1957 |